United States Patent [19]

Yagishita

[11] Patent Number: 4,963,258
[45] Date of Patent: Oct. 16, 1990

[54] FILTER WITH PERFORATED FIN PORTIONS EXTENDING FROM OUTER CYLINDRICAL WALL

[76] Inventor: Aisaburo Yagishita, 5-2, Shinpo-Cho 4-Chome, Chikusa-Ku, Nagoya, Japan

[21] Appl. No.: 148,967

[22] Filed: Jan. 27, 1988

Related U.S. Application Data

[63] Continuation of Ser. No. 17,900, Feb. 24, 1987, abandoned, which is a continuation of Ser. No. 550,090, Nov. 9, 1983, abandoned.

[51] Int. Cl.$^5$ ............................................. B01D 29/07
[52] U.S. Cl. .................................... 210/315; 210/487; 210/323.2
[58] Field of Search ............... 210/468, 487, 346, 347, 210/323.1, 232.2, 338, 492, 447, 446, 330, 331, 342, 315, 232, 238

[56] References Cited

U.S. PATENT DOCUMENTS

| | | | |
|---|---|---|---|
| 1,693,717 | 12/1928 | Lienesch | 210/487 |
| 1,723,053 | 8/1929 | McKinley | 210/487 |
| 1,909,308 | 5/1933 | Nugent | 210/487 |
| 1,951,484 | 3/1934 | Lawes | 210/487 |
| 2,000,137 | 5/1934 | Kelley | 210/487 |
| 2,189,458 | 2/1940 | Carrier et al. | 210/487 |
| 2,835,393 | 5/1958 | Buckman | 210/487 |
| 2,844,255 | 7/1958 | Cavenah et al. | 210/486 |
| 2,914,179 | 11/1959 | Foust | 210/323.2 |
| 2,988,227 | 6/1961 | Harms | 210/487 |
| 3,096,281 | 7/1963 | Smith et al. | 210/487 |
| 3,202,284 | 8/1965 | Wade | 210/346 |
| 3,294,141 | 12/1966 | Sicard et al. | 210/232 |
| 3,448,862 | 6/1969 | Kudlaty | 210/492 |
| 3,647,071 | 3/1972 | Lamort | 210/487 |
| 3,664,095 | 5/1972 | Asker et al. | 210/506 |
| 3,813,334 | 5/1974 | Bray | 210/487 |
| 4,075,106 | 2/1978 | Yamazaki | 210/487 |
| 4,105,562 | 8/1978 | Kaplan et al. | 210/323.2 |
| 4,154,688 | 5/1979 | Pall | 210/487 |
| 4,263,140 | 4/1981 | Wujnovich et al. | 210/446 |
| 4,290,889 | 9/1981 | Erickson | 210/492 |
| 4,406,787 | 9/1983 | Suto et al. | 210/487 |
| 4,419,234 | 12/1983 | Miller et al. | 210/323.2 |

FOREIGN PATENT DOCUMENTS

| | | | |
|---|---|---|---|
| 034416 | 8/1981 | European Pat. Off. | 210/487 |
| 626699 | 10/1961 | Italy | 210/323.2 |
| 59-73016 | 4/1984 | Japan | 210/323.2 |
| WO82/01322 | 3/1983 | PCT Int'l Appl. | 210/323.2 |
| 698635 | 11/1979 | U.S.S.R. | 210/486 |
| 496985 | 1/1939 | United Kingdom . | |
| 619626 | 5/1949 | United Kingdom . | |
| 773588 | 5/1957 | United Kingdom . | |
| 1094306 | 12/1967 | United Kingdom . | |
| 1389748 | 4/1975 | United Kingdom . | |
| 2088245 | 6/1982 | United Kingdom . | |
| 2095572 | 10/1982 | United Kingdom . | |
| 2096480 | 10/1982 | United Kingdom . | |

Primary Examiner—Peter Hruskoci
Assistant Examiner—Cynthia L. Nessler
Attorney, Agent, or Firm—Fred Philpitt

[57] ABSTRACT

A filter assembly comprises a casing, a semiflexible, perforated core and a filter cloth. The casing is provided with a liquid inlet and a liquid outlet and the core is arranged within the casing and between the liquid inlet and the liquid outlet so that liquid which passes from the inlet to the outlet must pass through the core at least once. The filter cloth covers the surfaces of the core so that liquid which passes from the inlet to the outlet must pass through the filter cloth at least once. In a first embodiment, the core includes an outer cylindrical portion, an inner cylindrical portion, an annular intermediate portion extending between the outer cylindrical portion and the inner cylindrical portion, and a plurality of fin portions extending radially inward from the outer cylindrical portion toward the inner cylindrical portion. In a second embodiment, the core includes a cylindrical portion and a plurality of fin portions extending radially outward from the cylindrical portion.

5 Claims, 7 Drawing Sheets

FIG.1(B') 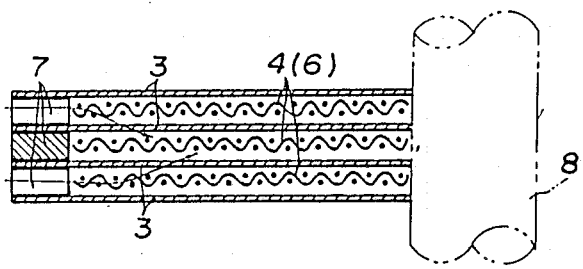

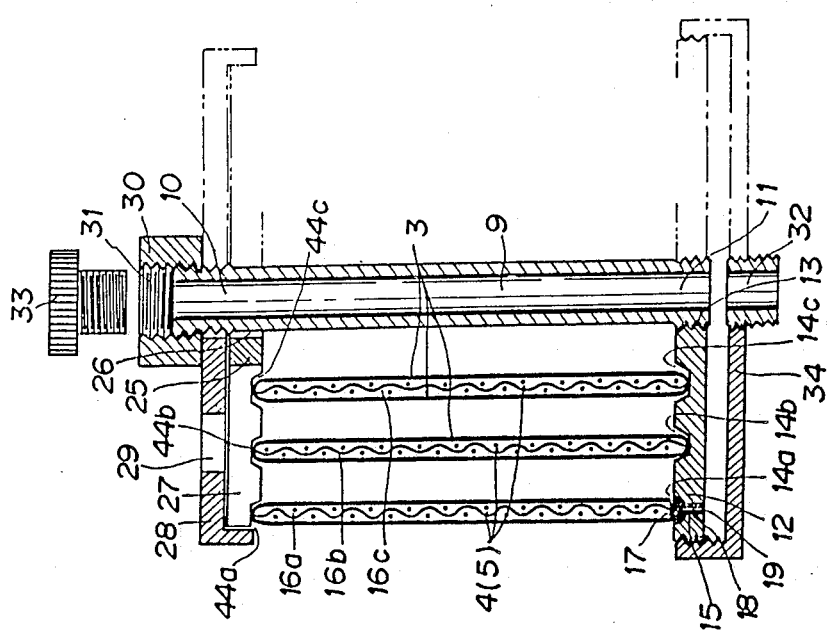
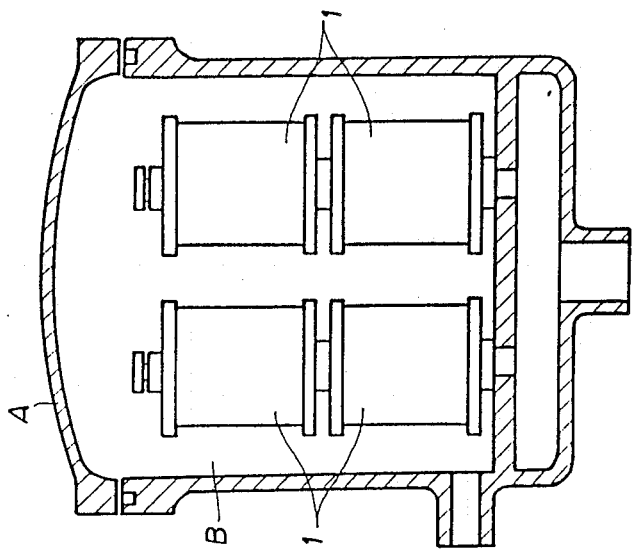
FIG. 3
FIG. 2

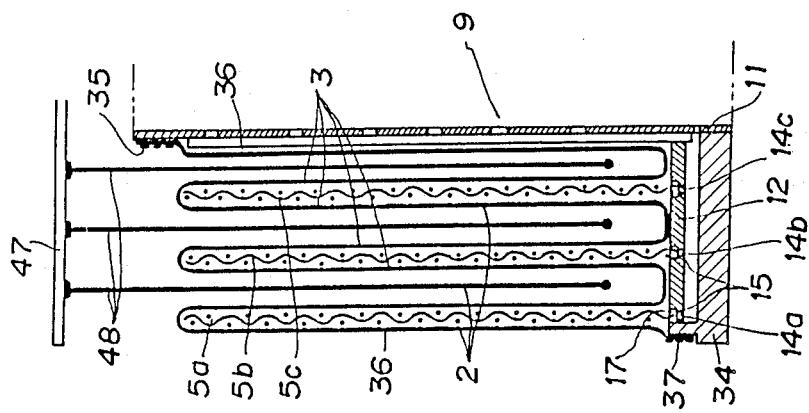
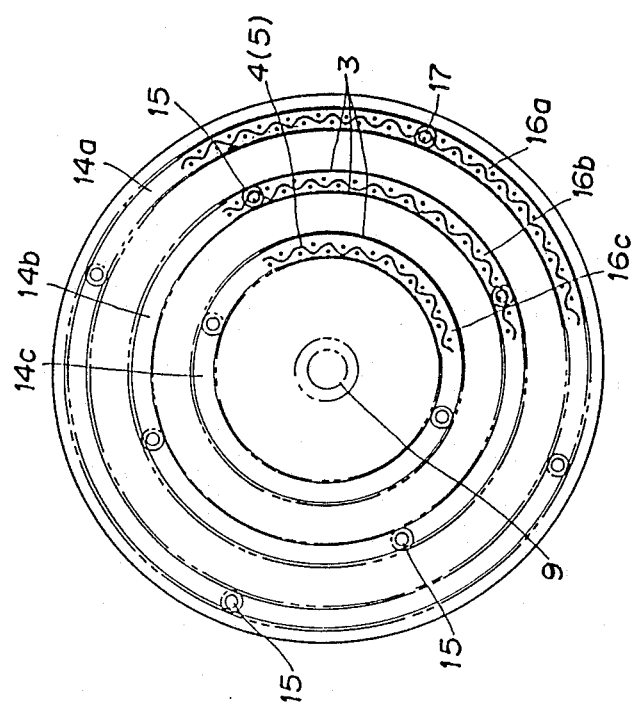

FILTER WITH PERFORATED FIN PORTIONS EXTENDING FROM OUTER CYLINDRICAL WALL

This application is a continuation of application Ser. No. 07/017,900, filed on Feb. 24, 1987 and abandoned, which is a continuation of application Ser. No. 06/550,090, filed on Nov. 9, 1983, abandoned.

BACKGROUND OF THE INVENTION

This invention relates to a construction for a filter in which a single or plurality of identical filter structures are connected to a pressure filter tank in a pressure filter apparatus in a plurality of stages to collect and discharge a large amount of filtrate.

In many cases, the filter material to be utilized in the conventional filter that effects a pressure surface filtering is prepared by pasting and fixing a filter material such as synthetic resin fiber including a cotton cloth to a frame member of the filter in a specific direction. The resulting filter material is used for the filtration operation, but when the filtration pressure is elevated, the filter material is deformed due to the filtering pressure of the untreated liquid which lowers the performance of or damages the filter apparatus. Therefore, the support frame of the filter cloth is designed and manufactured with a rigid material having a considerable margin for strength. It has been discovered that the filter pressure on both surfaces of the filter cloth can be cancelled out by the provision of a filter material including filter cloth on both of the surfaces centering around a core member with holes. There is no need to provide the extra strength of the support frame to the core member with holes. The core material can thus be molded with a relatively soft semi-hardening material, and a spacer effect for preventing the fusing of the filter cloth on both the surfaces can be provided to maintain the function of the filter liquid path.

SUMMARY OF THE INVENTION

It is an object of this invention to construct a filter in which a filter material is provided with filter cloth on both the surfaces of a core member with holes. The core member may comprise a core cylinder or a core sheet. The filtering area can be remarkably increased by providing filtering on both surfaces of the core, which surfaces are excellent in strength when the change in the filtering pressure occurs, whereby a low filter speed and a remarkable filtering efficiency can be obtained.

It is another object of this invention to construct a filter in which core members with holes or substituting members having liquid passing properties are interposed between the adjacent filter materials which comprise the core members with holes whose both surfaces are covered with the filter cloth.

It is yet another object of this invention to form a filter liquid path on the core member with holes. An increment in the filter liquid path is obtained by forming the core member with a graduated wall thickness increasing towards a liquid collecting pipe. The graduating thickness corresponds to the fluctuation of volume of the filter liquid that is collected and increased as it approaches a central liquid collecting pipe.

It is still a further object of this invention to provide a core member comprising a multiplex ring core cylinder consisting of independent cylindrical filter materials concentrically disposed in a multiplex ring arrangement.

It is a further object of this invention to construct a filter of a multiplex ring arrangement in which the multiplex ring core cylinder is formed by concentrically arranging the cylindrical core members in a multiplex ring form. The filter further comprises a long bag like filter cloth which is sequentially folded inwardly into the core cylinder and at its lower end portion is fixed to the circumferential side surface of the bottom plate.

It is yet a further object of this invention to provide a filter including a filter material in which the core member with holes is formed by a combination of a core cylinder and core sheets. The core sheets are arranged with holes on the inverse radiant lines moving toward the center portion and are connected with the inner wall surface of the core cylinder. Both of the cores are covered with a filter cloth.

It is a still further object of this invention to provide a filter in which the core sheets are arranged on the inverse radiant lines moving towards the center portion and are connected with the inner wall surface of the core cylinder. Additional core sheet members with holes are provided on the radiant line and are connected with the outer wall surface of an inner central core cylinder with holes of small diameter. The core sheets are covered with a filter cloth as a whole so that both filter materials are disposed in the meshed engaging posture with their corresponding surfaces.

It is a particular object of this invention to provide a filter provided with a filter material in which core members which are arranged on a radiant line are longer than a radius of circular space for housing the filter material. The core members are connected with the outer wall surface of the inner central core cylinder with holes of small diameter and both of them are covered as a whole.

The present invention relates to a filter assembly comprising a casing, a semiflexible, perforated core and a filter cloth. The casing is provided with a liquid inlet and a liquid outlet and the core is arranged within the casing and between the liquid inlet and the liquid outlet so that liquid which passes from the inlet to the outlet must pass through the core at least once. The filter cloth covers the surfaces of the core so that liquid which passes from the inlet to the outlet must pass through the filter cloth at least once. In a first embodiment, the core includes an outer cylindrical portion, an inner cylindrical portion, an annular intermediate portion extending between the outer cylindrical portion and the inner cylindrical portion, and a plurality of fin portions extending radially inward from the outer cylindrical portion toward the inner cylindrical portion. In a second embodiment, the core includes a cylindrical portion and a plurality of fin portions extending radially outward from the cylindrical portion.

BRIEF DESCRIPTION OF THE DRAWINGS

FIG. 2 is a schematic view of a pressure filter apparatus, wherein several sets of filter units coupled in a plurality of stages are installed in the pressure filter layer to effect the collection and discharge of the large volume of the filtrate;

FIGS. 3–5 show a first embodiment of the shape of the filter material, FIG. 3 is a side view of vertical cross section of a center portion, and FIG. 4 is a lateral cross section of a center portion, and FIGS. 5 (A)-(D) are several kinds of embodiments of a fixing portion;

FIGS. 6-8 show a second embodiment of the shape of the filter, FIG. 6 is a side view of cross section of center portion, FIG. 7 is a lateral cross section of a center portion, and FIG. 8 is a cross section showing a fixing portion;

FIG. 9 is a side view of cross section of center portion, and FIG. 10 is a lateral cross section of a center portion;

DETAILED DESCRIPTION OF THE INVENTION

Figure 1A:
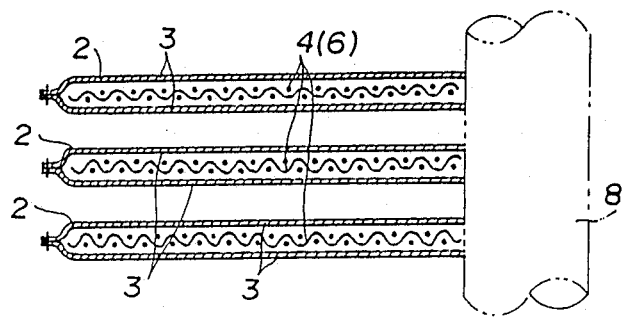
FIG. 1 shows a first and third embodiments of a construction of a filter material that is a main object of this invention.

The construction of a filter material (2) for constituting a filter (1) which is a primary object of this invention is formed as shown in FIGS. 1 (A)-(C) in which both surfaces of the filter are covered with a filter cloth (3) centering around a core member (4) with holes. Since the pressure is cancelled out at both surfaces against the change of the filter pressure, it is necessary to form the filter material with a semi-hardening material capable of demonstrating a relatively soft bending strength. As the material, in case of using metal, a flexible screen is available, and in case of using synthetic resin, integrally molded screen having a flexibility can be employed. In whatever cases, known materials can be used for the purpose. The embodiment 1 on the structure of the filter material (2) is shown in FIG. 1(A), and wherein the filter material (2) is disposed (by keeping a proper gap) at speed intervals.

Figure 1B:
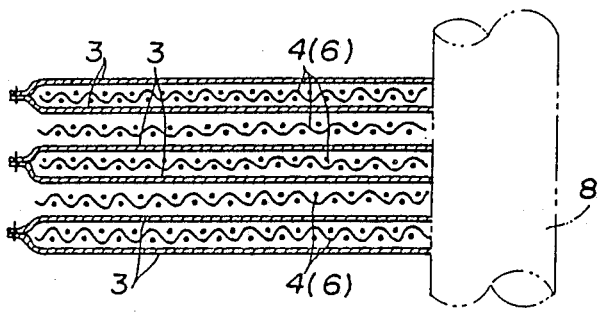

The second embodiment is shown in FIG. 1(B), and provides for laminating the filter material (2) in a plurality of lamination, the core members (4) with holes being interposed between the adjacent filter materials (2). Next, FIG. 1(B') shows an example of construction in which a filter cloth sheet (3a) and a frame (7) employing a principle of filter press are sequentially superposed and clamped. In this embodiment, the untreated liquid may be introduced into a middle of both surface filter cloths in a method similar to the principle of the filter press. In this case, there is no adverse influence on the filter cloth (3) resulting from the pressure deformation on account of the provision of a core member (4) comprising a core sheet with holes (6) which act as a spacer between the adjacent filter materials.

Figure 1C:
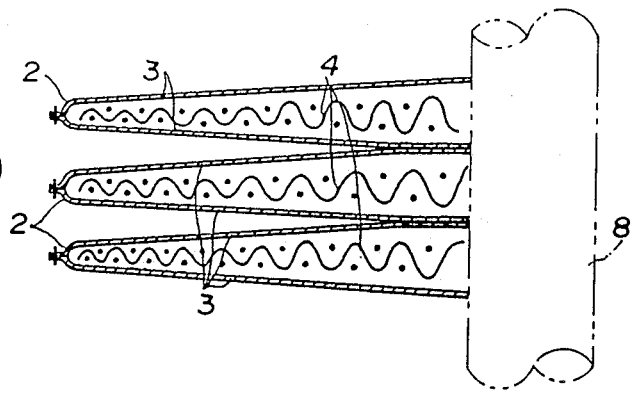

The third embodiment is shown in FIG. 1(C), wherein core member (4) with holes is formed with a thickness gradually increasing toward a liquid collecting portion (8). The graduated thickness corresponds to the fluctuation of volume of filter liquid that is collected and increased as it approaches the liquid collecting portion (8) in each filter material (2). The filter liquid path is thus increased, and the resulting filter speed is made constant. It is desirable to effect stronger clamping between the adjacent filter materials (2) in this embodiment.

The inventiveness of the filter material (2) of this invention resides in that the material quality of the core member with holes can be molded from a semi-hardening material such as metal or synthetic resin which can withstand the fluctuation of the filter pressure and also provide a smooth filter liquid path which prevents the fusing of both the surfaces filter cloths (3) (3). The cloths (3) can be easily secured on account of the core member with holes (4).

Next, with respect to shape, the filter material (2) can be formed in any of the first to fifth embodiments related to the shape of the filter material (2) disclosed. The first embodiment will be described according to the attached drawings of FIGS. 3-5.

With reference to FIGS. 2-5, numeral (1) denotes a filter to be used in the filter process in which several sets of the core members with holes coupled in a plurality of stages are installed in a pressure filter tank (B) to collect and discharge a filtrate of large volume. A lower end screw portion includes a tubular axis (9) formed with screw portions (10) and (11) at both the top and bottom end portions, respectively. The screw portion (11) is connected to a female screw (13) of a center hole portion contained in support bottom plate (12). The upper surface of the plate (12) is engraved with multiplex ring grooves (14a)-(14c) at equal intervals. A proper number of through holes (15) are formed at proper positions on each ring groove of the multiplex ring grooves (14a)-(14c) of the bottom plate. A greater number of through holes may be in the outward large diameter ring groove (14a), for example holes pieces; and a smaller number of through holes may be in the inward small diameter ring groove (14c), for example holes pieces. Reference numerals (16a)-(16c) denote concentrically arranged cylindrical filter materials, each diameter being formed sequentially smaller to form a multiplex ring configuration. Both inside and outside surfaces of a porous core cylinder (5) are covered with a filter cloth (3). The lower end of each is fitted and secured by selecting a corresponding groove of the multiplex ring grooves (14a)-(14c) in the upper surface of the support bottom plate (12). The securing portion (17) shifts the filter liquid and keeps the fitting posture in the ring groove (14), where for example, a connecting tube (18) made of elastic material as shown in FIG. 3 is fitted. In another embodiment, this securing portion may be fixed to the bottom surface of the support bottom plate (12) by means of a nut (19) in the center through hole and a connecting tube with screw (FIG. 5(A)).

Figure 5A:
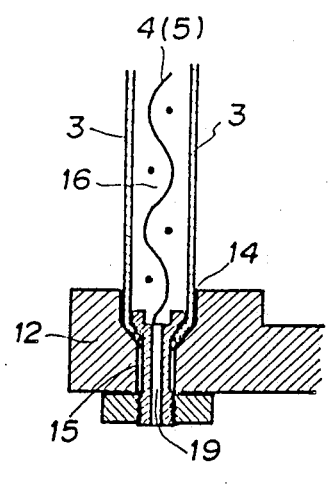
Figure 5B:
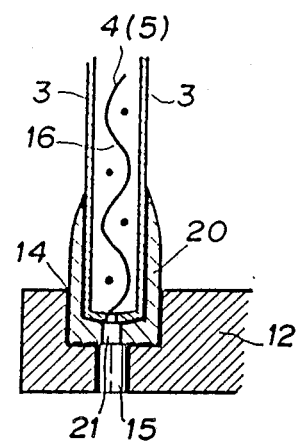
Figure 5C:
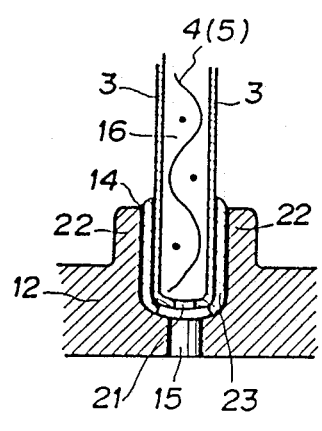
Figure 5D:
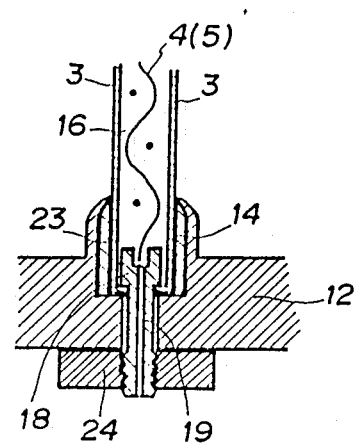

Furthermore, other embodiments of the securing portion (17) shown in FIG. 5(B)-(D) can be utilized. FIG. 5(B) shows an embodiment in which a packing material (20) is provided whose cross section is a concave annular shape. The packing material is fit to a filter material (16) by means of an elastic material such as rubber, and is pressure fit to a corresponding annular groove (14). It is necessary to bore a through hole (21) beforehand at a corresponding position to the through hole (15) in the annular groove (14). FIG. 5(C) shows a bonding and fixing mechanism in which the support bottom plate (12) is formed of an integral member made of synthetic resin of a hard type such as polypropylene or vinyl chloride. Band portions (22) (22) are provided on both sides of the ring groove (14) beforehand and are formed in a projection mode to provide a deep groove wall surface. An enlargement of the bonding area is obtained by a bonding agent (23) such as Fron sol. FIG. 5(D) shows the embodiment in which the bottom plate (12) is molded by elastic material such as rubber, and the bonding agent (23) and a fixing means comprising a saucer type screw (24) shown in FIG. 5(A) are collectively used. Referring back to FIG. 3, (25) denotes a horizontal arm member including extension (27) which is extended in radial directions, for example, in four directions. Arm (25) is formed with a center through hole (26). A filter material posture holding plate in which downward multiplex ring grooves (44a)-(44c) are formed is provided on the lower surface of each arm member (27). The grooves (44a)-(44c) correspond to the multiplex ring grooves (14a)-(14c) formed on the upper surface of the bottom plate (12). The top portions of the cylindrical filter materials (16a)-(16c) of the multiplex ring posture are secured therein, and a multi-hole cover (28) formed with a liquid passing hole (29) is applied over the upper surface of the filter material posture holding plate (25). A connecting adaptor (30) formed with a female screw (31) is screwed to the upper end screw portion (10) of the tubular axis (9). In one embodiment, a filter (1) having the identical construction may be disposed above a first filter, whereupon the lower end of the male screw connecting adaptor (32) connected with the tubular axis (9) of the upper filter is connected with the female screw (31) of the connecting adaptor (30) of the lower filter. However, if an upper stage filter is not provided, a blank cap (33) is screwed and fixed thereto. Reference numeral (34) denotes a lower liquid collecting board screwed to the peripheral side surface of the bottom plate immediately below the bottom plate (12). The center of the board is screwed to the male screw connecting adaptor (32) which may be connected with the female screw connecting adaptor (30) of the lower stage filter.

When the untreated liquid in the pressure filter tank (B) is pressure filtered to the filter cloth (3) formed on both the inside and outside surfaces of the cylindrical filter materials (16a)-(16c), the filter cloth (3),(3) of both the surfaces form hollow liquid paths. By disposing the multi-core cylinder (5) in the center portion, the filter liquid flows down easily in the downward directions and is discharged to the lower part of the bottom plate (12) through the center through hole (19) thereby passing the filtrate liquid through the fixing portion (17) of the lower end. All the filtered liquid discharged from the through hole (15) formed on each annular groove (14a)-(14c) is collected by the sealed liquid collecting board (34) and is collectively discharged by means of the hollow portion of the female screw connecting adaptor (32).

Figure 7:
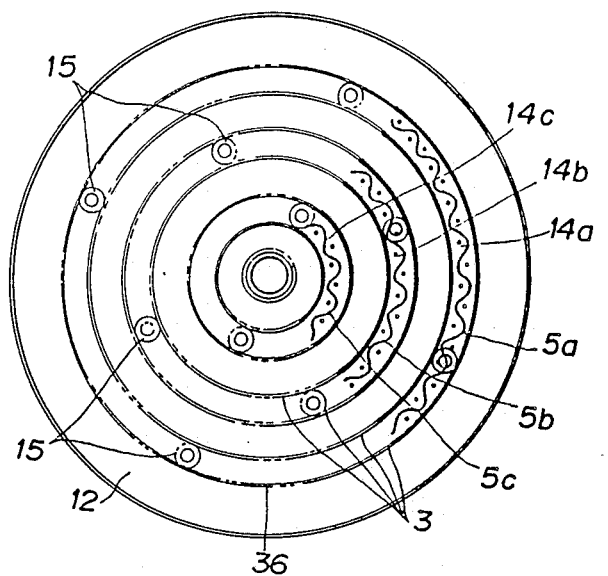
Figure 8:
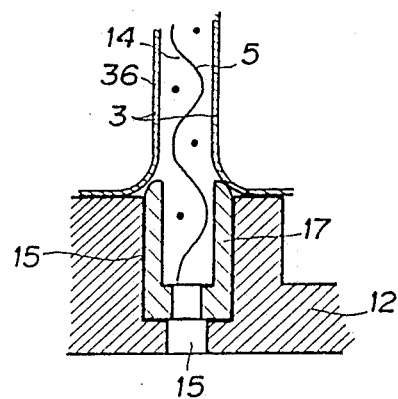

The second embodiment of the shape of the filter material (2) will be described referring to FIGS. 6-8. The support bottom plate (12) is formed with the multiplex ring grooves (14a)-(14c) at equal intervals and on the upper surface is screwed to the lower end screw portion (11) of the tubular axis (9). The liquid collecting board (34) is screwed to and connected with the peripheral side surface of the bottom plate. A proper through hole (15) is formed on the multiplex ring grooves (14a)-(14c) of the bottom plate. The filter cloths (3),(3) are formed to cover both the inside and outside surfaces of the core cylinders (5a)-(5c) provided with holes. A bag like filter cloth (36) sequentially folded around the cores, the upper end being fixed at (35) and its lower end being fixed at (37) at the peripheral side surface of the liquid collecting board (34). When the filter material (2) is contaminated with the sludge and needs to be exchanged, the core cylinders (5a)-(5c) which are of the multiplex ring arrangement can be separated while remaining integral with the bottom plate (12). This is accomplished by lifting upward the upper end of the bag like cloth (36) which is fixed at (35) to the upper part of the tubular axis (9). As a result, the filter material exchange operation can be simplified. This is indispensable for the maintenance of the filtering function and is achieved by the combination of the core cylinder (5) with holes and the bag filter cloth (36). Reference numeral (47) denotes a pushing jig including push leg portions (48) for insertion of the long bag filter cloth (36).

Figure 10:
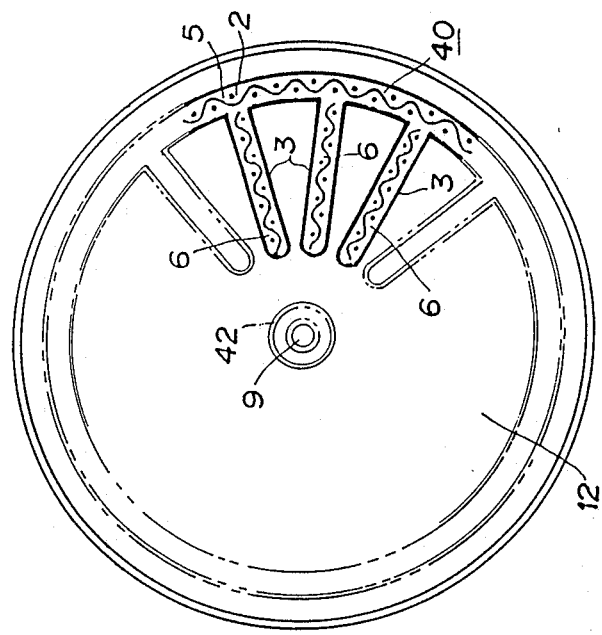
FIGS. 9 and 10 show a third embodiment of the shape of the filter material.
Figure 9:
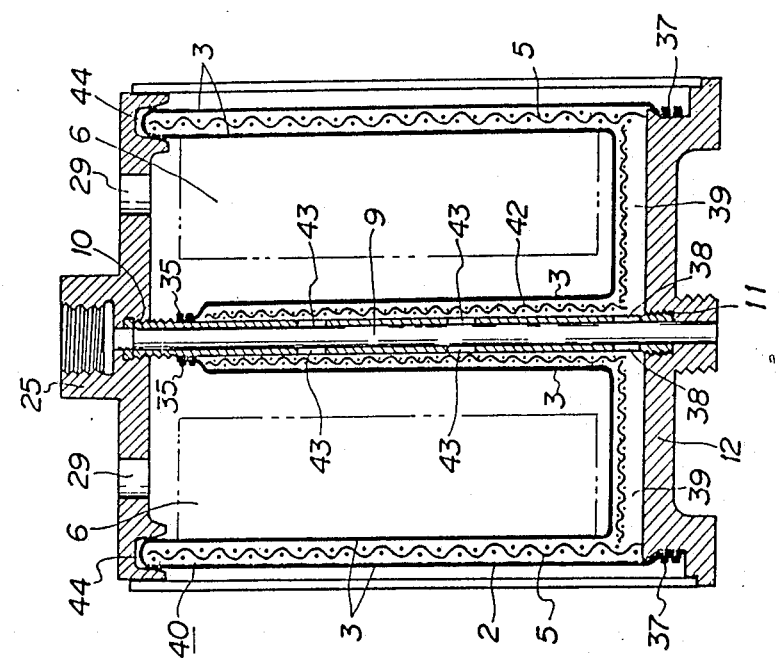

Moreover, the third embodiment of the shape of the filter material (2) will be described referring to FIGS. 9-10. The support bottom plate (12) is formed with radial liquid collecting grooves (39) on its upper surface. The plate is screwed to the lower end screw portion (11) of the tubular axis (9) which is formed with a low hole (38). the inverse radiant line filter material (40) is formed by integrally covering the core cylinder (5) and the core sheet (6) with the filter cloth (3). A small diameter core cylinder (42) with holes covers the tubular axis (9) which is formed with a large number of liquid passing holes (43) on the peripheral surface. The outer surface of core 42 is covered with the filter cloth that extends from the filter cloth (3). The filter material posture holding plate (25) formed with an annular groove (44) and a liquid passing hole (29) is provided adjacent to the upper end of the core cylinder (5) and is screwed to the upper end screw portion (10) of the tubular axis (9).

Figure 11A:
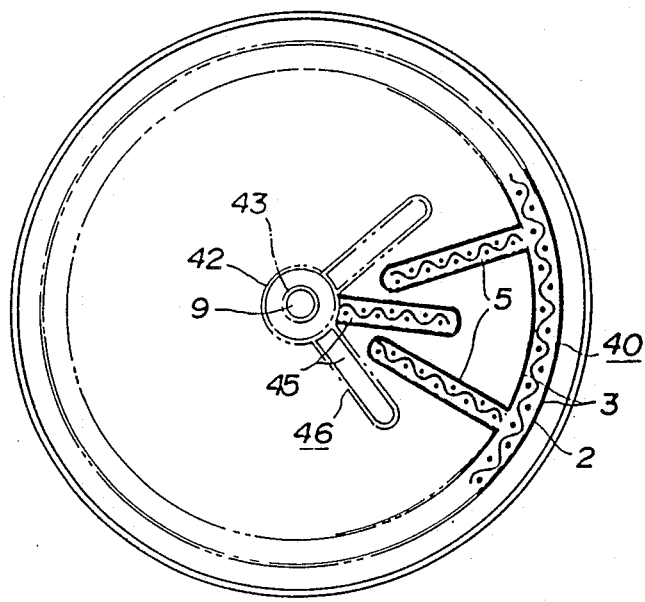
FIG. 11 is a lateral cross section of a center portion showing a fourth embodiment of the shape of the filter material.
Figure 11B:
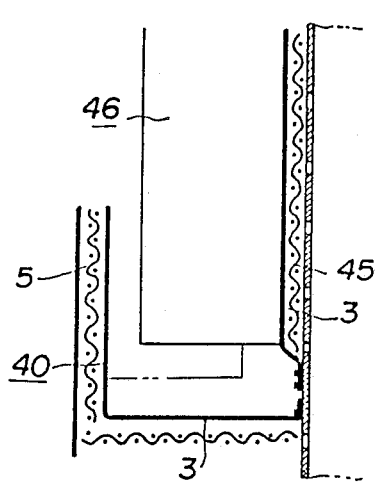

Furthermore, the fourth embodiment of the shape of the filter material (2) will be described referring to FIG. 11. A filter is disclosed in which the inverse radiant line filter material (40) of the third embodiment and the radiant line filter material (46) are connected with the core sheet (45) on the radiant line in the outer wall surface of the inner central core cylinder (42). The tubular axis (9) is formed with the liquid passing hole (43), and both filter materials are covered as a whole by the filter cloth (3) to form the filter material (2). The mutually opposed core sheets (5) and (45) with holes are disposed in mutually meshed condition. The filter cloth (3) connects the inverse radiant line filter material (40) on the side of the core cylinder (5) that becomes the outer frame with the radiant line filter material (46) on the side of the core cylinder (45) with holes of small diameter. The center can be separated and fixed in the lower part of the tubular axis (9), and provides for an easy disassembling operation when the cleaning is carried out.

Figure 12:
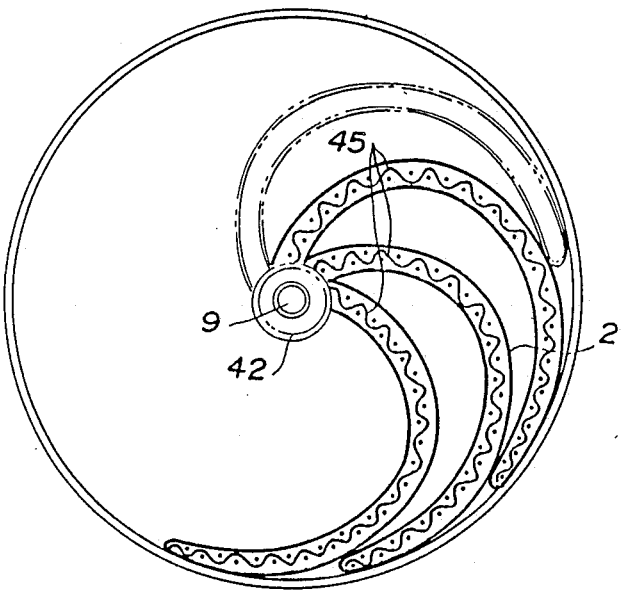
FIG. 12 is a lateral cross section of a center portion showing a fifth embodiment of the shape of the filter material.

Furthermore, the fifth embodiment of the shape of the filter material will be described referring to FIG. 12. In the outer wall surface of the core cylinder (42) with holes of small diameter, the core sheets (45) with holes are arranged on the radiant line and are longer than the radius of the space for housing the filter material,. Both of the cores are covered as a whole whereby the filter material (2) is formed. The core sheet (45) with holes arranged on the radiant line is wound in the winding condition in a specific direction by utilizing the characteristic of core flexibility. In this case, it is possible to utilize a separate core sheet with holes as a spacer between the adjacent filter materials.

The core sheet (6) with holes in the foregoing third to the fifth embodiments may be formed so that the graduated wall thickness may become thinner toward the tip thereof. This is based on the same principle as the embodiment of FIG. 1(C).

Similarly, the core member (4) with holes in the third to fifth embodiments is formed by the combination of the core cylinder (5) with holes and the core sheet (6)

with holes, but the core cylinder (5) with holes is formed to have a bigger liquid passing performance than that of the core sheet (6) with holes that becomes the branch portion so that it is desirable to form the meshes to be coarse intentionally.

As described in the foregoing, as the operation and effect common to the first to the fifth embodiments, the core cylinder (5) with holes and the core sheet (6) with holes constitute the core member (4) with holes of the core material (2), whereby the filter liquid path is formed. Since the posture deformation of the filter material (2) due to the filter pressure is absent, a smooth filtering function can be provided. Moreover, the filter construction is simple in that the bottom plate (12) in the tubular axis (9) and the posture holding plate (25) are screw connected so that the assemblying operations and disassembling operations are easy. Therefore, the filter is capable of providing improved filtering efficiency.

What is claimed is:

1. A filter assembly, comprising:
   (a) a casing provided with a liquid inlet and a liquid outlet;
   (b) a semiflexible, perforated core arranged within the casing and between the liquid inlet and the liquid outlet so that liquid which passes from the inlet to the outlet must pass through the core at least once, said core including a perforated outer cylindrical wall, a perforated inner cylindrical wall, a perforated annular bottom wall connected with and extending between the lower ends of the outer cylindrical wall and the inner cylindrical wall, and a plurality of perforated fin portions connected with and extending radially inward from the outer cylindrical wall toward the inner cylindrical wall; and
   (c) a filter cloth covering the surfaces of said core so that liquid which passes from the inlet to the outlet must pass through the filter cloth at least once.

2. A filter assembly as defined in claim 1, wherein the core further includes a plurality of fin portions connected with and extending radially outward from the inner cylindrical wall toward the outer cylindrical wall.

3. A filter assembly as defined by claim 1, wherein the length of each of said fin portions in the radial direction is greater than the distance in the radial direction from the cylindrical portion to the casing whereby the fin portions extend outwardly in a curved configuration.

4. A filter assembly as defined by claim 1, wherein a perforated tubular member is arranged inside the inner cylindrical wall of the core, one end of which tubular member is in communication with the liquid outlet.

5. A filter assembly as defined by claim 4, wherein the casing includes a second liquid outlet, the core is arranged between the liquid inlet and the second liquid outlet so that liquid which passes from the inlet to the second outlet must pass through the core at least once, the filter cloth covers the surfaces of the core so that liquid which passes from the inlet to the second outlet must pass through the filter cloth at least once, and the other end of the tubular member is in communication with the second outlet.

* * * * *